United States Patent [19]
Johns et al.

[11] Patent Number: 6,157,319
[45] Date of Patent: Dec. 5, 2000

[54] UNIVERSAL REMOTE CONTROL SYSTEM WITH DEVICE ACTIVATED SETUP

[75] Inventors: Gregory L. Johns, Carlsbad; James N. Conway, Jr., Corona Del Mar; Patrick H. Hayes, Mission Viejo, all of Calif.

[73] Assignee: Universal Electronics Inc., Cypress, Calif.

[21] Appl. No.: 09/121,229

[22] Filed: Jul. 23, 1998

[51] Int. Cl.[7] .................................................. G08C 19/00
[52] U.S. Cl. ............................ 340/825.72; 340/825.22; 340/825.37; 340/10.31; 340/10.34; 340/10.42; 340/825.69; 341/173; 341/176; 348/734
[58] Field of Search ..................... 340/825.22, 825.37, 340/10.31, 10.34, 10.42, 825.69, 825.72, 825.56; 341/176, 173; 348/734

[56] References Cited

U.S. PATENT DOCUMENTS

| | | | |
|---|---|---|---|
| 4,626,848 | 12/1986 | Ehlers | 340/825.69 |
| 4,746,919 | 5/1988 | Reitmeier | 340/825.56 |
| 5,255,313 | 10/1993 | Darbee . | |
| 5,519,457 | 5/1996 | Nishigaki et al. | 348/734 |
| 5,552,917 | 9/1996 | Darbee et al. . | |
| 5,726,645 | 3/1998 | Kamon et al. | 340/825.22 |
| 5,909,183 | 6/1999 | Borgstahl et al. | 340/825.22 |
| 5,959,539 | 9/1999 | Adolph et al. | 340/825.07 |

*Primary Examiner*—Brian Zimmerman
*Assistant Examiner*—Yves Dalencourt
*Attorney, Agent, or Firm*—Mark R. Galis; Gary R. Jarosik; John E. Hyatt

[57] ABSTRACT

A universal remote control system with device activated set up wherein the device to be controlled such as a TV, VCR or other consumer electronic product, and the associated remote control unit are pre-programmed and adapted to automatically reconfigure the remote control unit to communicate with a device to be controlled as soon as said device is connected to its power source.

21 Claims, 3 Drawing Sheets

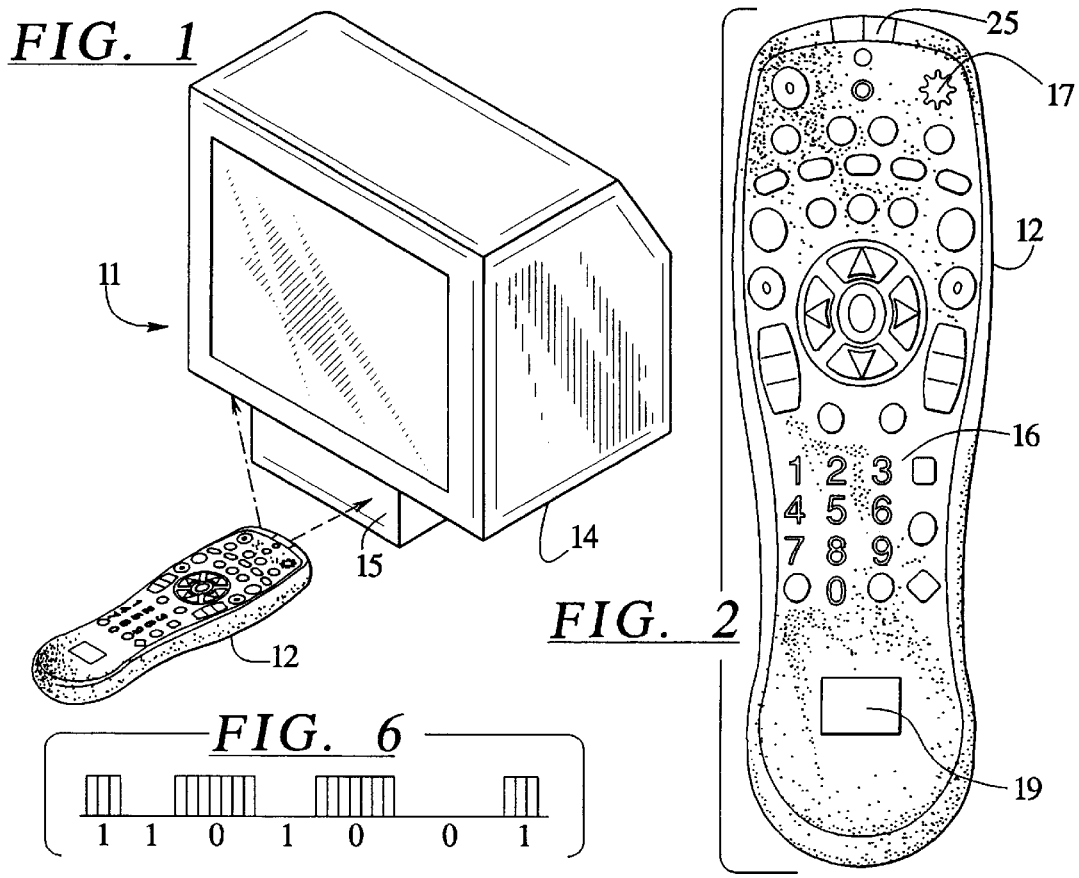
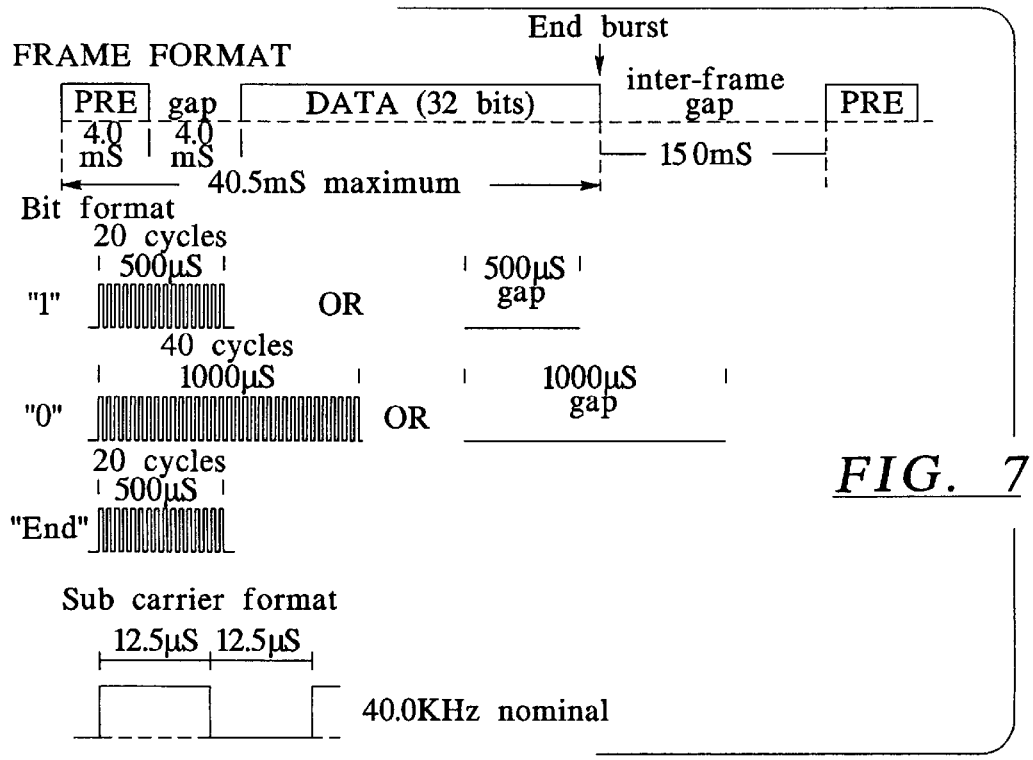

UNIVERSAL REMOTE CONTROL SYSTEM WITH DEVICE ACTIVATED SETUP

BACKGROUND OF THE INVENTION

This invention relates generally to infrared remote control systems and, more particularly, to universal remote control units wherein one remote control unit can control a number of various types of devices such as televisions, video cassette recorders (VCRs), cable boxes, disk players and other electronic equipment. The invention provides an improvement to such universal remote control systems for enabling the devices and remote control unit to be ready to communicate with each other, and to enable commands to be sent from the remote control unit to a device substantially as soon as the unit is connected to a power source.

Most manufacturers provide remote controls to control their equipment, and equipment of different manufacturers are often controlled with different remote control units. To minimize the number of individual remote control units a user requires, universal remote control units have been developed. Accordingly, infrared remote control units for controlling various functions of television receivers, VCR's, and auxiliary electronic equipment have become quite widespread in recent years. U.S. Pat. No. 5,255,313 issued to Darbee and assigned to Universal Electronics Inc., and U.S. Pat. No. 5,552,917 issued to Darbee et al and assigned to Universal Electronics Inc. disclose universal remote control systems.

In a common method of setting up and using a universal remote control unit, infrared ("IR") function codes that are to be learned and used are made available from the device to be controlled. The consumer or user is required to program or adapt the universal remote control unit to control the user's particular equipment, such as television sets, VCR's, entertainment media, and other devices. Alternatively, codes can be preprogrammed into the remote control to communicate with the equipment to be controlled. In either case, the programming and adaption of the universal remote control to the user's particular equipment can be demanding, exacting and generally frustrating for many users.

SUMMARY OF THE INVENTION

This invention provides a universal control system wherein the equipment to be controlled and the associated remote control unit are preprogrammed and adapted to automatically configure or reconfigure the remote control unit to communicate with the equipment to be controlled as soon as the equipment is connected to a power source, in other words, the equipment to be controlled activates the setup of the remote control.

The foregoing features and advantages of the present invention will be apparent from the following more particular description of the invention. The accompanying drawings, listed hereinbelow, are useful in explaining the invention.

BRIEF DESCRIPTION OF THE DRAWINGS

FIG. 1 is a plan view of an inventive universal remote control unit with device activated setup capability;

FIG. 2 is a sketch showing the inventive system wherein a remote control unit provides controls to a TV set and VCR;

FIG. 6 is a sketch showing the bit pattern of the data stream of the inventive system; and FIG. 7 is a sketch illustrating the frame format, the bit format and the subcarrier format of the burst-type modulation used in the present invention.

DESCRIPTION OF THE INVENTION

Figure 3:
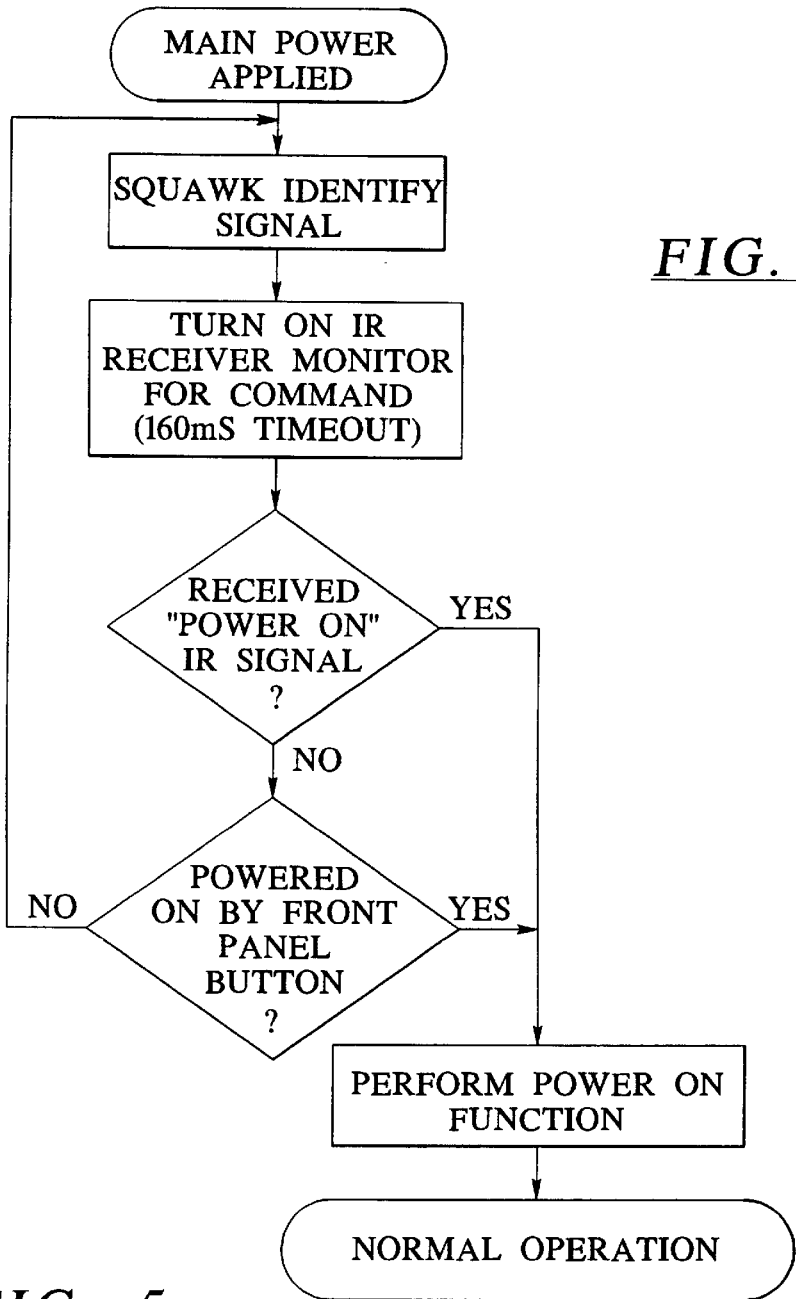
FIG. 3 is a flow chart of the initial power application process of the inventive system.

The present invention relates to a universal remote control system with device activated setup capability. As stated above, universal remote control units are prevalent in the market place. Each of these remote control units are used to control various types and brands of electronic devices (equipment) in the consumer's or user's home such as the TV, the VCR, cable box, disk player, etc. However, the prior art universal remote control systems have to be programmed or adapted by the user to control his particular equipment. Often this programming and adaptation becomes quite difficult and frustrating to the user. As stated above, the present invention is directed to providing a system wherein the devices to be controlled and the remote control unit are ready to enter into communication with each other as soon as the device is plugged into a power source, and without requiring the user to program or code in a set of commands; that is, the remote control unit can be setup with minimal intervention and involvement of the user.

FIG. 1 depicts the inventive system 11 wherein a universal remote control unit with device activated setup (hereinafter "universal remote control unit with DAS") capability 12 is positioned to control a TV set 14 and a VCR 15. FIG. 2 shows the universal remote control device with DAS 12 in more detail. The remote control 12 includes a microcontroller 19, an IR transmitter and an IR receiver, generally labeled as 20, various command keys generally labeled 16, and the power key or button 17, all as is well known.

A consumer or user will purchase a new universal ready VCR 15 in accordance with the invention to replace his old VCR of any known brand. The inventive universal system instructions will direct the user to: a) plug the new VCR 15 into a power source, b) hold the universal remote control unit with DAS 12 close to VCR 15, and c) press the power button to turn the VCR 15 on. When this is done, VCR 15 "powers on" and the universal remote control unit with DAS 12 which previously controlled the old VCR now controls new VCR 15. A VCR is being referred to herein for purposes of explanation, however, it is to be understood that the invention relates to and is useful with a variety of other electronic devices or equipment as referred to above.

There are other ways to get into the identify mode or state. For instance, if the user owns equipment before he acquires a universal remote control unit with DAS, additional means to get the equipment to communicate or squawk are necessary. In this regard, the TV or other electronic device can be equipped with a menu which provides a means for initiating the squawk mode. Additionally, the squawk mode can be accessed by having the user hold down a combination of buttons on the front panel of the device. Additionally, it is possible to simulate the plugging in of the electronic device by having some type of master reset button that can be accessed on the device.

FIG. 3 is a flow chart of the software program for the initial power application process for VCR 15. Briefly referring to FIG. 3, when AC power is applied, VCR 15 emits an identity squawk signal and then "turns on" its IR receiver and monitors for a command. If VCR 15 receives a "power on" signal, it performs a "power on" function and proceeds to normal operation. If VCR 15 does not receive a "power on" IR signal, the program checks to see if power has been "turned on" from its front panel; if it has, VCR 15 performs the "power on" function and proceeds to normal operation. If VCR 15 has not been "powered on" by its front panel button, the squawk process is repeated.

To explain in more detail, the programmed operating logic of the system 11 is such that when the new VCR 15 detects that it has been plugged in but has not yet received a "power on" signal from the remote control unit 12, the VCR enters an initialization state and transmits an IR data signal, comprising an identification or "squawk" signal which identifies:

a) the type of device it is, and b) the remote control encoding format to which it responds. After sending out its squawk signal, VCR 15 listens for a period of time for a "power on" command in its specified format.

Figure 4:
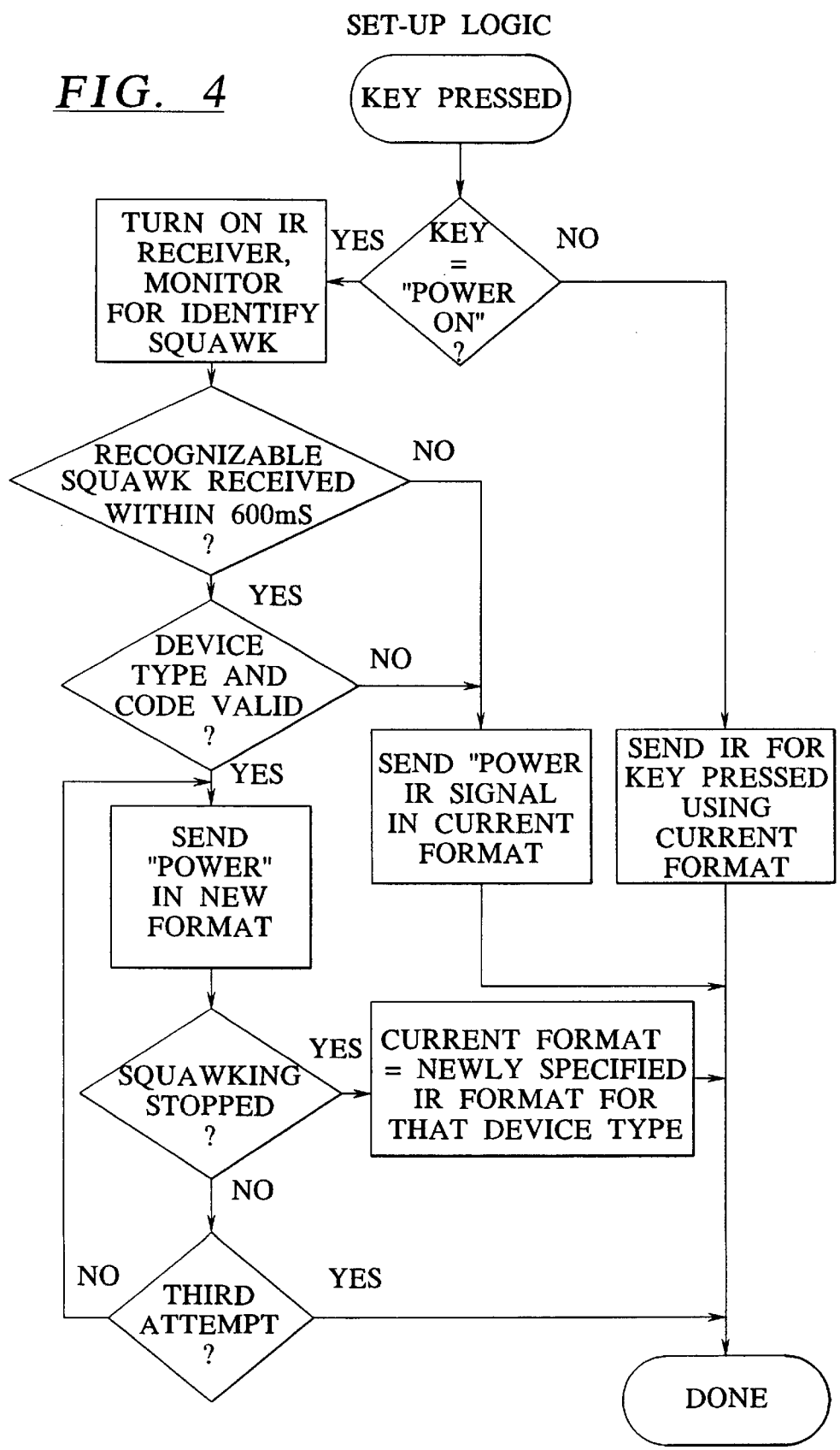
FIG. 4 is a flow chart of the preprogrammed system set-up logic of the inventive system.

Referring now to FIG. 4 which is a flow chart of the software program for the set-up logic for the remote control unit 12. If the user simply presses any key 16, other than the power button 17, on the remote control unit 12, this wakes-up or energizes the microcontroller 19 in the remote control unit 12 and causes it to send the appropriate IR signal in the usual manner. In the case wherein the power button 17 of remote control unit 12 is actuated, the microcontroller 19 first briefly places itself in the receive mode and listens for a squawk signal. If no squawk is detected, remote control unit 12 proceeds to send the power function in the normal manner, and since the "power on" operation generally takes a few seconds, the brief (millisecond) delay caused by the listening time period is not noticeable to the user.

If the microcontroller 19 of remote control unit 12 detects a recognizable squawk during this pre-power listening period, it proceeds to analyze the identification data. If the VCR 15 type and requested IR format are supported by the remote control unit 12, the microcontroller 19 commences executing the sequence of instructions needed to send an appropriate IR code in response to the squawk signal from the VCR. Thus, the remote control unit 12 reconfigures its programming to the VCR 15 and then transmits the power command in the new format. If the device or equipment is not supported by the remote control unit 12, the remote control simply remains unchanged in its previous configuration. If no "power on" command is received, VCR 15 repeats its identification "squawk" and listens again, continuing this alternating squawk/listen sequence until such time as a response is received. As soon as a valid "power on" command is received, VCR 15 exits this initialization state and commences normal operation.

In standard universal remote controls, the user selects a transmission format by looking up a designation number for his device in a code list supplied with the remote control, and enters that designation number into the remote control. As becomes clear from the foregoing explanation, a principal object of the identification squawk of the inventive system is to allow the device to automatically supply this designation number to the remote control unit. Once the designation number has been supplied to the remote control unit, the programming and mechanisms involved in this set-up process are well known in the art and need not be described in detail herein.

If the user presses the power button on the front panel of the VCR, this will also cause the VCR to exit the squawking state. That makes provision for a user who does not wish to use a remote control unit. Using a single function remote control unit will also cause the VCR to exist the "squawk" state, thus providing a control means for the user who does not use a universal remote control.

Figure 5:
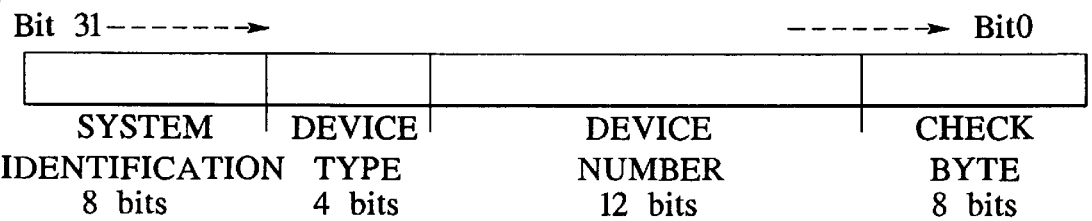
FIG. 5 is a sketch showing the data frame layout of the inventive system.

FIG. 5 shows the data frame layout. The data content of the squawk signal is a 32 bit value, utilized as shown in the following table:

8 bits System identification to allow possible future multiple versions of the system to co-exist without interfering with one another's settings.

4 bits Device category

00 TV 08 CD player

01 VCR 09 Amplifier

02 Cassette tape 10 Tuner

03 Laser disk 11 Home automation

04 Digital audio tape 12 Misc. audio

05 Cable box 13 Phonograph

06 Satellite IRD 14 DVD

07 Video Accessory 15 Spare 12 bits Device designation number, set-up code in the pre-programmed library.

8 bits check byte (longitudinal parity of the preceding three bytes)

The data is transmitted, most significant bit first, using a burst duration modulation scheme as follows:

Encoding: Burst duration modulation using amplitude shift keyed IR subcarrier.

Subcarrier: 40 KHz

Bit encoding: Basic time interval is t=500 us (20 cycles of subcarrier. Burst times (nominal) are t and 2t. Gap times (nominal) are t and 2t.

Frame format: Bits per frame: 32

Preamble burst: 4.OmS (8t)

Preamble gap: 4.OmS (8t)

Interframe gap: 150 mS minimum

The encoded data stream consists of alternating intervals of carrier and no carrier. The duration of each interval signals the value of the bit corresponding to that location. Ones are represented by short intervals, zeros are represented by long intervals. An example of the bit pattern for "1101001" is encoded as shown in FIG. 6. The data frame layout is shown in FIG. 7. Each data frame is preceded by a preamble (pre) burst which consists of a 4.0 mS of constant carrier, followed by a 4.0 mS gap; which is followed in turn by a inter-frame gap of 150 mS during which time the transmitting unit monitors its receiver for a "power on" command in the format requested by the squawk it has just transmitted. Note that the VCR (or other device to be controlled by the remote control unit) can provide squawks alternating between a number of different device numbers if it is capable of supporting multiple formats.

This encoding format is one implementation but other encoding schemes can be used to achieve the same result. As described above, the device to be controlled (VCR 15 in this case) begins by transmitting its squawk in the format described above. As is shown in FIG. 7, in the bit encoding scheme used, the minimum frame time (including the preamble burst) is 24.5 mS, while the maximum frame time is 40.5 mS. The exact time is dependent on the particular mixture of ones and zeros being sent. After sending a squawk, the device then enables its IR receiver and monitors for a "power on" command. If no command is detected after 150 mS of monitoring, the device continues to repeat this pattern. Since the majority of remote control transmission formats use a frame repetition rate equal to or less than 120 mS, the 150 mS monitoring time is adequate to allow a standard (non-universal) remote control shipped with the system to initiate a power on command and cause the device to exit the initial state, in the event the user does not have a universal remote control unit.

If however, the user is introducing a universal remote control unit to the system, he holds it near to the device to be controlled and presses the "power" key. When the remote control detects that the power key has been pressed, it first enables its IR receiver for approximately 600 mS and monitors for a valid squawk. Since the squawk is repeated at least once every 190 mS, there will be at least three opportunities to decode a valid squawk during this time interval. The methods for receiving decoding such an IR data stream are well known.

If no squawk is detected, or if a squawk is detected but specifies a device (equipment) type or number not supported by this remote control, the remote control simply sends the "power" command in the normal manner and in the format currently in use. As mentioned above, the short delay introduced by the initial monitoring interval will generally not be noticed by the user, since the power on function is usually slower than most other commands. However, if a valid squawk is detected, the remote control responds by sending a "power" command in the requested format, commencing during the 150 mS inter-frame interval. Some devices may require multiple repeats of an IR command code before responding, however it is sufficient to start sending the command during the inter-frame gap. Once the device to be controlled detects that it is receiving a possible command, its internal logic will suspend the squawk cycle until it has made a final determination regarding the signal being received.

After sending the "power" command, the remote control unit then monitors to confirm that the squawking has ceased. If squawking has ceased, the remote control then sets itself to operate using the newly specified format for all future operation. If the squawking has not ceased, the remote control will try the sequence twice more before abandoning the attempt and exiting with current settings unchanged.

As disclosed in a co-pending U.S. patent application, the receiver circuit, used for the listening function in the inventive system, can use the transmit IR LED as a detector. This will reduce the cost of the circuit and enhance packaging convenience.

It is also important to note that the controlling unit may be a type of device other than a hand held remote control unit. For instance, the controlling device could be a personal computer, that is, the personal computer would receive the "squawk" and set itself to operate the particular electronic product to be controlled. In yet another embodiment, in situations where the user has an electronic device that does not include DAS, the personal computer could have the capability of performing the function of setting up the remote control unit through the use of DAS wherein the requisite information for set up is stored in the memory of the personal computer.

Infrared (IR) has been selected as the communication medium for this embodiment since unidirectional IR sending and receiving functionality is already available in remote control applications and this requires the least amount of additional hardware. However, other transmission mediums such as radio frequency ("RF"), inductive coupling, visible light (modulating a TV picture signal) would be equally suitable as a communication mediums.

While the invention has been particularly shown and described with reference to a particular embodiment thereof it will be understood by those skilled in the art that various changes in form and detail may be made therein without departing from the spirit and scope of the invention.

What is claimed is:

1. A method for readying an electronic device for operation, the method comprising:

periodically transmitting an identification signal;

determining if a command has been received from a control device adapted to control the operation of the electronic device, the command being sent from the control device in response to the identification signal;

if it is determine that the command has been received from the control device, ceasing the transmission of the identification signal; and if it is determined that the command has not been received from the control device, determining if the command has been received from a source other than the control device and, if it is determined that the command has been received from a source other than the control device, ceasing the transmission of the identification signal and causing the electronic device to perform the command.

2. The method as recited in claim 1, wherein the command is a command to power the electronic device.

3. The method as recited in claim 1, wherein the electronic device is adapted to transmit the information and the step of transmitting the identification signal further comprises embodying the identification signal in an IR signal.

4. The method as recited in claim 1, wherein the source other than the control device is a command key on the electronic device.

5. The method as recited in claim 1, wherein the step of determining if a command has been received from the control device further comprises listening at the electronic device for an IR command signal sent by the control device.

6. A readable media having instructions for readying an electronic device for operation, the instructions performing steps comprising:

periodically transmitting an identification signal;

determining if a command has been received from a control device adapted to command the operation of the electronic device, the command being sent from the control device in response to the identification signal;

if it is determine that the command has been received from the control device, ceasing the transmission of the identification signal; and if it is determined that the command has not been received from the control device, determining if the command has been received from a source other than the control device and, if it is determined that the command has been received from a source other than the control device, ceasing the transmission of the identification signal and causing the electronic device to perform the command.

7. In a control device configured to transmit a command in a format recognized by a first electronic device, a method for adapting the control device to transmit the command in a format recognized by a second electronic device, the method comprising:

sensing an activation of a key that initiates transmission of the command;

determining if the second electronic device is present;

if it is determined that the second electronic device is present, transmitting the command in the format recognized by the second electronic device; and if it is determined that the second device is not present, transmitting the command in the format recognized by the first electronic device.

8. The method as recited in claim 7, wherein the step of determining further comprises listening for a transmission of an identification signal from the second electronic device.

9. The method as recited in claim 8, wherein the step of listening is performed for a predetermined period of time and, if the identification signal is not received within the predetermined period of time, performing the step of deeming the second electronic device to be not present.

10. The method as recited in claim 7, wherein the command is a power command.

11. The method as recited in claim 8, wherein the step of transmitting the command in a format recognized by the second electronic device further comprises the step of listening for an acknowledgement from the second electronic device that the command has been received.

12. The method as recited in claim 11, wherein the acknowledgement from the second electronic device comprises the cessation of the transmission of the identification signal.

13. The method as recited in claim 11, wherein the step of transmitting the command in a format recognized by the second electronic device is repeated a predetermined number of times.

14. The method as recited in claim 7, wherein the command is transmitted using an IR signal.

15. A readable media having instructions for causing a control device configured to transmit a command in a format recognized by a first electronic device to transmit the command in a format recognized by a second electronic device, the instructions performing the steps comprising:

sensing an activation of a key on the control device the activation of which initiates transmission of the command;

determining if the second electronic device is present;

if it is determined that the second electronic device is present, transmitting from the control device the command in the format recognized by the second electronic device; and if it is determined that the second device is not present, transmitting from the control device the command in the format recognized by the first electronic device.

16. A system with device activated setup and control, the system comprising:

an electronic device;

a remote control adapted to command the operation of the electronic device;

wherein the electronic device comprises a means for periodically transmitting an identification signal and the remote control comprises a means for sensing an activation of a key that initiates transmission of a command, a means for determining if the electronic device is transmitting the identification signal, and means for transmitting the command in a first format not recognized by the electronic device if it is determined that the electronic device is not transmitting the identification signal and for transmitting the command in a second format recognized by the electronic device if it is determined that the electronic device is transmitting the identification signal; and wherein the electronic device further comprises a means for determining if the remote control is transmitting the command signal in the second format and a means for ceasing the transmitting of the identification signal if it is determined that the remote control is transmitting the command signal in the second format.

17. In a remote control having command keys and a memory in which are stored a plurality of codes for use in causing the transmission of commands in formats recognized by a plurality of different electronic devices, a method for adapting the remote control to transmit commands in a format recognized by a selected one of the plurality of electronic devices, the method comprising:

receiving from the selected one of the plurality of electronic devices an identifying message; and using the identifying message to map to the command keys selected ones of the plurality of codes stored in the memory such that subsequent activation of a command key causes the remote control to transmit a corresponding command in the format recognized by the selected one of the plurality of electronic devices.

18. The method as recited in claim 17, further comprising the steps of sensing the activation of a command key and transmitting a corresponding command using an IR signal.

19. The method as recited in claim 17, further comprising the step of causing the remote control to listen for the identifying message in response to an activation of a command key.

20. The method as recited in claim 19, wherein the remote control listens for the identifying message in response to the activation of a power command key.

21. A readable media having instructions for configuring a remote control comprising command keys and a memory in which are stored a plurality of codes for use in causing the transmission of commands in formats recognized by a plurality of different electronic devices, the instructions performing the steps comprising:

listening for an identifying message transmitted from a selected one of the plurality of electronic devices; and using the identifying message to map to the command keys selected ones of the plurality of codes stored in the memory such that subsequent activation of a command key causes the remote control to transmit a corresponding command in a format recognized by the selected one of the plurality of electronic devices.

* * * * *

UNITED STATES PATENT AND TRADEMARK OFFICE
CERTIFICATE OF CORRECTION

PATENT NO.  : 6,157,319
DATED       : December 5, 2000
INVENTOR(S) : Gregory L. Johns, James N. Conway, Jr. and Patrick H. Hayes It is certified that error appears in the above-identified patent and that said Letters Patent is hereby corrected as shown below:

Column 6,
Lines 9, 27 and 42, delete "adapted"
Line 59, delete "adapting" and substitute with -- configuring --

Column 7,
Line 49, delete "adapted"

Column 8,
Line 19, delete "adapting" and substitute with -- configuring --

Signed and Sealed this

Seventh Day of May, 2002

*Attest:*

*Attesting Officer*

JAMES E. ROGAN
*Director of the United States Patent and Trademark Office*